US011726871B2

(12) United States Patent
Lee et al.

(10) Patent No.: US 11,726,871 B2
(45) Date of Patent: Aug. 15, 2023

(54) STORAGE CONTROLLER FOR SELECTING A GEAR LEVEL OF A STORAGE DEVICE AND STORAGE SYSTEM INCLUDING THE SAME

(71) Applicant: Samsung Electronics Co., Ltd., Suwon-si (KR)

(72) Inventors: Jae-Kun Lee, Suwon-si (KR); Jea-Young Kwon, Hwaseong-si (KR); Hwan Kim, Hanam-si (KR); Song Ho Yoon, Yongin-si (KR); Sil Wan Chang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 34 days.

(21) Appl. No.: 17/466,392

(22) Filed: Sep. 3, 2021

(65) Prior Publication Data
US 2022/0206893 A1 Jun. 30, 2022

(30) Foreign Application Priority Data
Dec. 24, 2020 (KR) .......................... 10-2020-0183361

(51) Int. Cl.
G11C 29/00 (2006.01)
G06F 11/10 (2006.01)
G06F 11/07 (2006.01)
G06F 3/06 (2006.01)

(52) U.S. Cl.
CPC ........ G06F 11/1068 (2013.01); G06F 3/0619 (2013.01); G06F 3/0659 (2013.01); G06F 3/0679 (2013.01); G06F 11/076 (2013.01)

(58) Field of Classification Search
CPC .............. G06F 11/076; G06F 11/1068; G06F 11/1072; G06F 3/0614; G06F 3/0619; G06F 3/0659; G06F 3/0679; G11C 11/5642; G11C 16/26; G11C 2211/5641
See application file for complete search history.

(56) References Cited

U.S. PATENT DOCUMENTS

| 7,679,133 | B2 | 3/2010 | Son et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 10,175,892 | B1 | 1/2019 | Kim et al. |
| 10,373,693 | B2 | 8/2019 | Cha et al. |

(Continued)

FOREIGN PATENT DOCUMENTS

| CN | 106843771 A | 6/2017 |
| KR | 20150073224 A | 6/2015 |
| KR | 20180031289 A | 3/2018 |

*Primary Examiner* — Albert Decady
*Assistant Examiner* — Enamul M Kabir
(74) *Attorney, Agent, or Firm* — Harness, Dickey & Pierce, P.L.C.

(57) ABSTRACT

A storage system may include a memory device including a first region including a single-level cell and a second region different from the first region, and a storage controller configured to read data from the first region at a first gear level of a plurality of gear levels, determine an error level of the read data and a state of the memory device, and change the first gear level to a second gear level of the plurality of gear levels based on the determined error level of the data and the determined state of the memory device.

20 Claims, 9 Drawing Sheets

(56) References Cited

U.S. PATENT DOCUMENTS

| | | | |
|---|---|---|---|
| 10,629,289 B2 | 4/2020 | Zeng et al. | |
| 2009/0319859 A1* | 12/2009 | Alrod | G06F 11/1068 |
| | | | 714/752 |
| 2011/0082976 A1* | 4/2011 | Wu | G11C 11/56 |
| | | | 711/E12.001 |
| 2011/0233648 A1 | 9/2011 | Seol et al. | |
| 2013/0031431 A1* | 1/2013 | Sharon | G11C 16/3481 |
| | | | 714/719 |
| 2014/0006688 A1* | 1/2014 | Yu | G06F 12/0246 |
| | | | 365/185.03 |
| 2015/0085575 A1* | 3/2015 | Tam | G11C 29/50004 |
| | | | 365/185.11 |
| 2016/0306572 A1* | 10/2016 | Ryan | G11C 16/349 |
| 2018/0357013 A1* | 12/2018 | Shi | G06F 12/0246 |
| 2019/0265888 A1* | 8/2019 | Yang | G11C 11/5671 |
| 2019/0348143 A1* | 11/2019 | Zeng | G06F 11/1048 |
| 2020/0135280 A1 | 4/2020 | Hu | |
| 2020/0160906 A1 | 5/2020 | Lee et al. | |
| 2020/0293228 A1* | 9/2020 | Amaki | G06F 11/1068 |
| 2020/0348884 A1* | 11/2020 | Boenapalli | G06F 3/0679 |
| 2020/0401514 A1* | 12/2020 | Liang | G06F 12/0253 |
| 2021/0073119 A1* | 3/2021 | Amaki | G06F 3/0613 |

* cited by examiner

FIG. 4

| Gear Level | Predicted Data Error Range | Data Read Speed Level | Read Operation Time (tRead) |
|---|---|---|---|
| Level #5 | Non_Error (Read Error < Correctable Error) | Read Speed Level 5 (MAX) | tFast_Level 5 |
| Level #4 | Predicted Condtion #1 | Read Speed Level 4 | tFast_Level 4 |
| Level #3 | Predicted Condtion #2 | Read Speed Level 3 | tFast_Level 3 |
| Level #2 | Predicted Condtion #3 | Read Speed Level 2 | tFast_Level 2 |
| Level #1 | Predicted Condtion #4 | Read Speed Level 1 (NORMAL) | tFast_Level 1 (= tREAD_Normal) |

FIG. 5

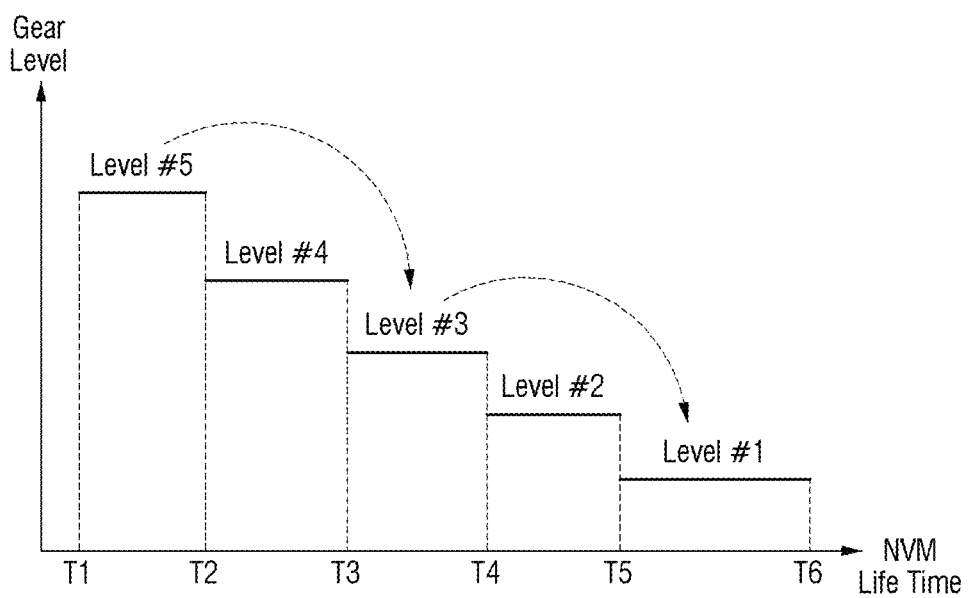

STORAGE CONTROLLER FOR SELECTING A GEAR LEVEL OF A STORAGE DEVICE AND STORAGE SYSTEM INCLUDING THE SAME

This U.S. non-provisional application claims the benefit of priority from Korean Patent Application No. 10-2020-0183361 filed on Dec. 24, 2020 in the Korean Intellectual Property Office, the disclosure of which is incorporated herein by reference in its entirety.

BACKGROUND

Various example embodiments of the inventive concepts relate to a storage device, a storage system, and/or a method of operating the storage device.

A flash memory device stores data by changing a voltage threshold of memory cells and reads the data using a desired and/or predetermined read level voltage. Recently, storage devices including a flash memory, such as a solid-state drive (SSD) and a memory card, have been widely used. This is because the flash memory device is a nonvolatile memory device having characteristics such as low power consumption and a high degree of integration.

In the flash memory device, in order to store write data transmitted from a host, the write data is stored in a memory block of a single-level cell area or a memory block of a multi-level cell area according to characteristics of the write data.

SUMMARY

Aspects of various example embodiments of the inventive concepts provide a storage device capable of ensuring data reliability and having an improved operating speed, a system including the storage device, and/or an operating method thereof.

Aspects of various example embodiments of the inventive concepts provide a storage device in which a data read speed is dynamically adjusted according to characteristics of a memory device, a system including the storage device, and/or an operating method thereof.

At least one example embodiment of the inventive concepts provides a storage system comprising a memory device including a first region including a single-level cell and a second region different from the first region, and a storage controller configured to read data from the first region at a first gear level of a plurality of gear levels, determine an error level of the read data and a state of the memory device, and change the first gear level to a second gear level of the plurality of gear levels based on the determined error level of the read data and the determined state of the memory device.

At least one example embodiment of the inventive concepts provides an operating method of a storage controller, comprising: reading data from a memory device using a first gear level of a plurality of gear levels, determining an error level of the read data and a state of the memory device, and dynamically setting a read speed of the memory device to a second gear level of the plurality of gear levels based on the determined error level of the read data and the state of the memory device.

At least one example embodiment of the inventive concepts provides a storage system comprising: a memory device storing data, and a storage controller a storage controller including an error correction code (ECC) engine and a read controller, the ECC engine is configured to detect level of errors included in data read from the memory device, and the read controller is configured to determine a state of the memory device, and dynamically set a read speed of the memory device to a first gear level from among a plurality of gear levels based on the detected level of errors by the ECC engine and the determined state of the memory device.

It should be noted that objects of the example embodiments of the inventive concepts are not limited thereto and other objects of the example embodiments of the inventive concepts will be apparent to those skilled in the art from the following descriptions.

BRIEF DESCRIPTION OF THE DRAWINGS

The above and other aspects and features of example embodiments of the inventive concepts will become more apparent by describing in detail example embodiments thereof with reference to the attached drawings, in which:

FIG. 4 illustrates a mapping table of a plurality of conditions for setting a gear level according to some example embodiments.

FIGS. 5 and 6 are conceptual diagrams illustrating operating methods of a storage system according to some example embodiments.

DETAILED DESCRIPTION

Hereinafter, various example embodiments of the inventive concepts will be described with reference to the accompanying drawings.

Figure 1:
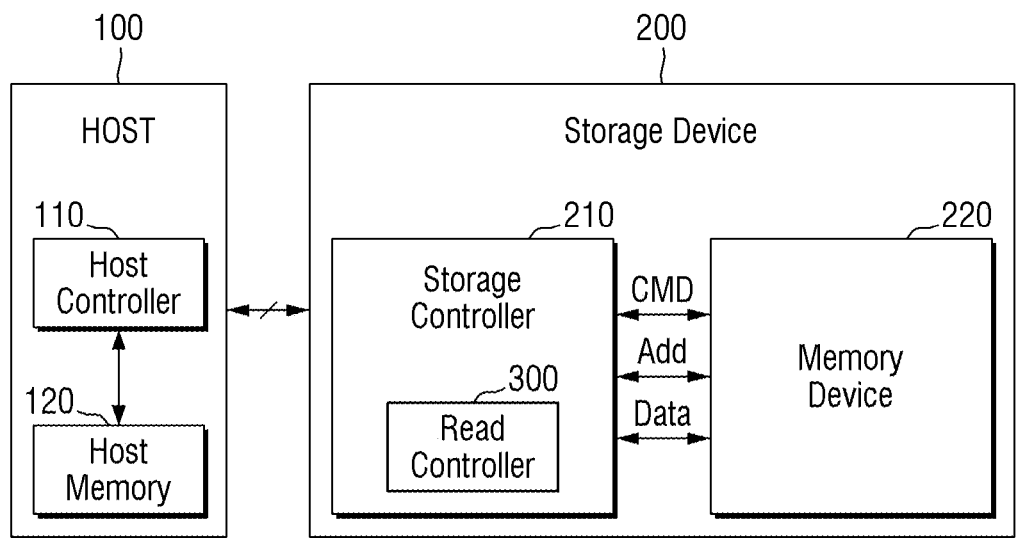
FIG. 1 is a schematic block diagram schematically illustrating a storage system according to some example embodiments.
Figure 2:
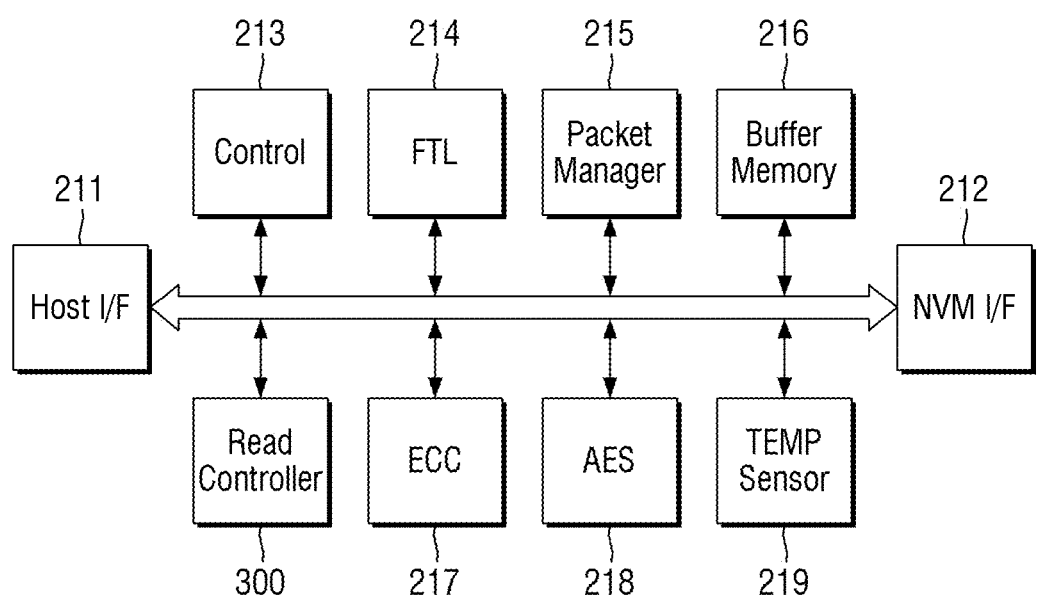
FIG. 2 is a block diagram illustrating a storage controller of FIG. 1 according to some example embodiments.
Figure 3:
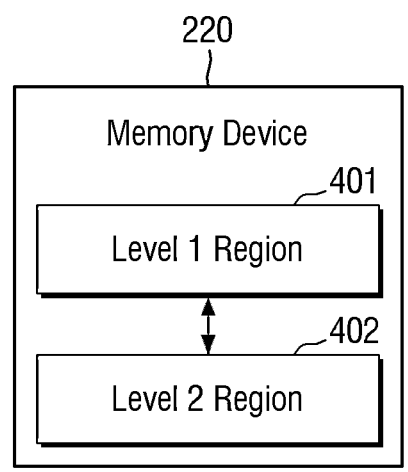
FIG. 3 is a block diagram illustrating a memory device of FIG. 1 according to some example embodiments.

FIG. 1 is a schematic block diagram schematically illustrating a storage system according to some example embodiments. FIG. 2 is a block diagram illustrating a storage controller of FIG. 1 according to some example embodiments. FIG. 3 is a block diagram illustrating a memory device of FIG. 1 according to some example embodiments.

Referring to FIG. 1, a host-storage system 10 may include at least one host 100 and/or at least one storage device 200, etc., but the example embodiments are not limited thereto, and for example, the system 10 may include a greater or lesser number of constituent elements, such as a plurality of hosts and/or a plurality of storage devices, etc. The storage device 200 may include at least one storage controller 210 and/or at least one memory device 220, etc., but the example embodiments are not limited thereto. According to at least one example embodiment, the memory device 220 may be a non-volatile memory (NVM), but the example embodiments are not limited thereto. According to at least one example embodiment of the inventive concepts, the host 100 (e.g., an external host, an external host device, etc.) may include at least one host controller 110 and/or a host memory 120, etc. The host memory 120 may function as a buffer memory for temporarily storing data to be transmitted to and/or data transmitted from the storage device 200, but is not limited thereto.

The storage device 200 may include storage media for storing data according to a request from the host 100. For example, the storage device 200 may include at least one of a solid-state drive (SSD), a disk drive, an embedded memory, and/or a removable external memory, etc. When the storage device 200 is an SSD, the storage device 200 may be a device conforming to the non-volatile memory express (NVMe) standard, but the example embodiments are not limited thereto. When the storage device 200 is an embedded memory and/or an external memory, the storage device 200 may be a device conforming to the universal flash storage (UFS) and/or embedded multi-media card (eMMC) standard, but is not limited thereto. The host 100 and the storage device 200 are each capable of generating and/or transmitting a packet (e.g., a data packet, etc.) according to an employed standard protocol.

When the memory device 220 of the storage device 200 includes a flash memory, the flash memory may include a two-dimensional (2D) NAND memory array and/or a three-dimensional (3D) (or vertical NAND (VNAND)) memory array, but the example embodiments are not limited thereto. As another example, the storage device 200 may include other various types of nonvolatile memories. For example, a magnetic random access memory (MRAM), a spin-transfer torque MRAM, a conductive bridging RAM (CBRAM), a ferroelectric RAM (FeRAM), a phase RAM (PRAM), resistive (RRAM), and/or various other types of memories may be applied as the storage device 200, but the example embodiments are not limited thereto.

According to at least one example embodiment, the host controller 110 and the host memory 120 may be embodied as separate semiconductor chips, but are not limited thereto. Additionally, in some example embodiments, the host controller 110 and the host memory 120 may be integrated on the same semiconductor chip, etc. For example, the host controller 110 may be one of a plurality of modules included in an application processor, etc., and the application processor may be embodied as a system-on-chip (SoC), etc. The host memory 120 may be an embedded memory provided in the application processor, and/or a nonvolatile memory and/or a memory module outside (e.g., external to) the application processor, etc.

The host controller 110 may manage an operation of storing data (e.g., write data) of the host memory 120 in the memory device 220 and/or storing data (e.g., read data) of the memory device 220 in the host memory 120, but is not limited thereto, and for example, may perform other data operations, such as an erase operation, a wear-level operation, a garbage collection operation, etc.

The storage controller 210 may include a host interface 211, a memory interface 212, and/or a control unit 213 (e.g., a controller, control circuitry, processing circuitry), etc., but the example embodiments are not limited thereto. The storage controller 210 may further include a flash translation layer (FTL) 214, a packet manager 215, a buffer memory 216, an error correction code (ECC) 217 engine, an advanced encryption standard (AES) 218 engine, and/or a read controller 300, etc., but is not limited thereto, and for example, may use a different type of data encryption engine. The storage controller 210 may further include a working memory (not shown) into which the FTL 214 is loaded, and the control unit 213 may execute the FTL 214 to control a data write operation and/or a data read operation with respect to the memory device 220, etc.

The host interface 211 may transmit at least one packet (e.g., data packet, etc.) to and/or receive at least one packet from the host 100. A packet transmitted from the host 100 to the host interface 211 may include a command and/or data to be written to the memory device 220, and a packet transmitted from the host interface 211 to the host 100 may include a response to the command and/or the data read from the memory device 220, but is not limited thereto. The memory interface 212 may transmit data, which is to be written to the memory device 220, to the memory device 220, and/or may receive data read from the memory device 220. The memory interface 212 may be implemented to comply with standard conventions, such as Toggle and/or ONFI, etc.

The FTL 214 may perform various functions such as address mapping, wear-leveling, and/or garbage collection, etc. Address mapping is an operation of converting a logical address received from the host 100 to a physical address to be used to actually (e.g., physically) store data in the memory device 220. Wear-leveling is a technology for allowing blocks included in the memory device 220 to be evenly used, thereby reducing and/or preventing excessive deterioration of at least one memory block, and may be implemented, for example, by a firmware technology for balancing erase counts of physical blocks, but is not limited thereto. Garbage collection is a technology for securing usable capacity in the memory device 220 by copying valid data of a block to a new block and erasing the block, but is not limited thereto.

The packet manager 215 may generate a packet according to and/or based on a communication protocol of an interface negotiated with the host 100 and/or parse various types of information from a packet received from the host 100. The buffer memory 216 may temporarily store data to be written to and/or data read from the memory device 220, etc. The buffer memory 216 may be provided in the storage controller 210, but may be located outside and/or external to the storage controller 210, but the example embodiments are not limited thereto.

The ECC engine 217 may perform an error detection and/or correction function on read data read from the memory device 220, but is not limited thereto. More specifically, the ECC engine 217 may generate parity bits with respect to write data to be written to the memory device 220, and the generated parity bits may be stored in the memory device 220 together with the write data. When data is read from the memory device 220, the ECC engine 217 may correct an error in the read data using the parity bits read from the memory device 220 together with the read data, and output the error-corrected read data, but the example embodiments are not limited thereto, and for example, the ECC engine 217 may output the parity bit data without correcting the read data, etc. The read controller 300 may obtain information regarding whether an error is detected and/or a level of the error from the ECC engine 217, etc.

The AES engine 218 (and/or encryption engine) may perform at least one of an encryption operation and/or a decryption operation with respect to data, which is input to the storage controller 210, using, for example, a symmetric-key algorithm, but the example embodiments are not limited thereto. For example, in at least one other example embodiment, the encryption engine may use an asymmetric-key algorithm, etc.

When data is read from the memory device 220, the read controller 300 may set a gear level, which is a reading speed, according to and/or based on operating characteristics of the memory device 220.

According to some example embodiments, the operating characteristics of the memory device 220 may include at least one of a data retention period, a temperature of the memory device 220, an endurance cycle, data read intensity, a unique chip characteristic, etc., and/or any combinations thereof.

The read controller 300 may read data from the memory device 220 at a currently set first gear level, identify an error in the read data and a state of the memory device 220, compare a result of the checking with a plurality of desired and/or preset conditions, and/or determine whether to maintain the first gear level or change the first gear level to a second gear level, etc., but the example embodiments are not limited thereto. According to at least one example embodiment, the read controller 300 may maintain the first gear level when the identified error and the state of the memory device 220 satisfy a desired and/or preset condition of the first gear level, and change the first gear level to the second gear level by selecting a different gear level, e.g., the second gear level, etc., corresponding to the identified error and the state of the memory device 220 when the identified error and the state of the memory device 220 do not satisfy the desired and/or preset condition of the first gear level, but the example embodiments are not limited thereto. According to some example embodiments, the plurality of desired and/or preset conditions may conditions specifically set with respect to a level of an error in read data and a state of the memory device 220. For example, the plurality of desired and/or preset conditions may include values set differently step by step with respect to at least one of an error threshold, whether the error in the read data is correctable or not, a data retention period, a temperature of the memory device 220, an endurance cycle, data read intensity, a unique chip characteristic, etc.

According to some example embodiments, the read controller 300 may include a mapping table including a plurality of desired and/or preset conditions corresponding to a plurality of gear levels, wherein at least one of the plurality of desired and/or preset conditions may be used to determine a gear level, etc.

The temperature sensor 219 may sense and/or measure an operating temperature of the memory device 220, etc. For example, a change in the operating temperature of a memory cell may be sensed by the temperature sensor 219. In some example embodiments, the storage controller 210 may not include the temperature sensor 219 and/or the temperature sensor 219 may be implemented as a part of the memory device 220, etc. The read controller 300 may obtain temperature information of the memory device 220 from the temperature sensor 219, but is not limited thereto.

Referring to FIG. 3, according to at least one example embodiment, the memory device 220 may include a plurality of first and second regions 401 and 402 classified according to and/or based on a cell level, but the example embodiments are not limited thereto, and for example, the memory device 220 may include a greater or lesser number of regions, etc. The first and second regions 401 and 402 may include a plurality of memory blocks and/or may be managed differently, but are not limited thereto. According to some example embodiments, for example, the first region 401 may be managed by a single-level cell (SLC) method, and the second region 402 may be managed by a multi-level cell (MLC) method, etc. Additionally, the first region 401 and/or the second region 402 may be managed by a triple-level cell (TLC) method and/or a quad-level cell (QLC) method, etc.

For example, the SLC, the MLC, and the TLC may be classified according to the amount of data that can be stored in one memory cell. The SLC may store only 1 bit per cell, the MLC may store 2 bits per cell, and the TLC may store 3 bits per cell, etc. Although not shown, the QLC may store 4 bits per cell. The amount of data to be stored increases in order from the SLC to the QLC but a data accessing speed gradually decreases and a cell lifetime decreases in order from the SLC to the QLC.

Accordingly, some of the write data (e.g., metadata, etc.) may be programmed in the first region 401, e.g., an SLC region, and the remaining write data excluding the metadata may be programmed in the second region 402.

For example, a speed at which a write and/or read operation is performed in the first region 401 is higher than in the second region 402, but is not limited thereto. Data that is frequently changed and/or frequently accessed according to a pattern of the host 100 may be stored in the first region 401, and data that is not frequently changed and/or not frequently accessed (e.g., less frequently changed and/or less frequently accessed) may be stored in the second region 402, but is not limited thereto. For example, data access patterns may be compared to a desired threshold access pattern (e.g., access rate, etc.) and data that exceeds the desired threshold access pattern may be stored in the first region 401 and data that meets and/or is lower than the desired threshold access pattern may be stored in the second region 402, etc., but the example embodiments are not limited thereto.

The memory device 220 may read data only at a constant speed, e.g., only at a fixed gear level from the first region 401 and/or the second region 402, to achieve data reliability even though the lifetime of the memory device 220 varies depending on a usage thereof, but the example embodiments are not limited thereto. The fixed gear level may be set as a stable criterion that satisfies reliability and/or lifetime conditions of the memory device 220 in consideration of the worst expected conditions in terms of reliability of the memory device 220, but is not limited thereto.

However, during use of the memory device 220, a user may hardly and/or rarely experience a situation in which reading data fails and/or a situation in which an error cannot be corrected, etc. Even if the user experiences such a situation, the user may experience the situation around the end of a lifetime of the memory device 200. Therefore, when the storage controller 210 allows data to be read by lowering requirements for data reliability, and dynamically changing a gear level according to current operating characteristics of the memory device 220, the performance of the storage device 200 (e.g., a storage system, a memory device system, etc.) may be improved by performing the reading of the data at a higher speed while increasing and/or guaranteeing the reliability of the memory device 220. This will be described in more detail with reference to FIGS. 6 and 7 below.

FIG. 4 illustrates a mapping table of a plurality of conditions for setting a gear level according to some example embodiments.

Referring to FIG. 4, a storage controller may include information for setting a corresponding gear level when a desired and/or predetermined condition for each of a plurality of gear levels is satisfied. For example, this information may be stored in the form of a mapping table, but the example embodiments are not limited thereto.

According to some example embodiments, in a mapping table, a plurality of gear levels are mapped to a plurality of conditions (e.g., storage device conditions, characteristics, etc.). According to some example embodiments, the mapping table may be stored in the read controller 300 described above with reference to FIGS. 1 and 2, but is not limited thereto. According to some example embodiments, the mapping table may be stored in a nonvolatile memory (not shown) included in the storage controller 210 and accessed by the read controller 300, but the example embodiments are not limited thereto.

According to some example embodiments, gear levels may include a plurality of gear levels between a lowest speed (e.g., lowest gear level) corresponding to a worst condition of the memory device 220, and a highest speed (e.g., a highest gear level) corresponding to a best condition of the memory device 220. That is, the mapping table may include a plurality of gear levels including a desired and/or preset minimum gear level (e.g., a lowest gear level, a first gear level, etc.), at least one desired and/or preset intermediate gear level (e.g., a second gear level, etc.), and a desired and/or preset maximum gear level (e.g., a highest gear level, a third gear level, etc.) corresponding to operating characteristics of the memory device 220, but the example embodiments are not limited thereto.

For example, Level #1 may represent a lowest-speed gear level at which both reliability and stability are improved and/or guaranteed when considering a worst condition in which the memory device 220 may operate. For example, Level #5 may represent a highest-speed gear level at which both data reliability and integrity are improved and/or guaranteed when considering a best condition in which the memory device 220 may operate.

Level #2, Level #3, and Level #4 may represent intermediate gear levels that gradually increase in order of Level #1 to Level #5, but the example embodiments are not limited thereto. According to at least one example embodiment, Level #1 to Level #5 may represent gear levels that increase linearly. That is, a speed difference between Level #1 and Level #2 may be the same as that between Level #2 and Level #3. According to at least one example embodiment, Level #1 to Level #5 may represent gear levels that increase non-linearly. That is, the speed difference between, for example, Level #1 and Level #2 may not be the same as that between Level #2 and Level #3, etc.

A data read time tRC may vary according to a selected and/or determined gear level. According to at least one example embodiment, the data read time tRC may refer to a time period until data is read from a cell and reaches a page buffer unit 440, starting from a time point at which a memory cell array is activated, but the example embodiments are not limited thereto. That is, the data read time tRC may refer to a time period until data is read from the memory cell array and reaches the pager buffer unit 440 after a read command Read CMD and an addresser ADDR are received from a memory interface, but is not limited thereto.

For example, a data read time at Level #2 may be less than that at Level #1 (tFast_Level2<tFast_Level1), etc. As another example, a data read time at Level #3 may be less than that at Level #2 (tFast_Level3<tFast_Level2), etc.

Each gear level may vary according to a predicted condition based on operating characteristics of the memory device 220. According to some example embodiments, the predicted conditions may be predicted constraints including at least one of a data retention period, a temperature of the memory device 220, an endurance cycle, a data read intensity, a unique chip characteristic, or any combinations thereof, but not limited thereto. The constraints may be prediction conditions set and/or arbitrarily set by a user according to at least one example embodiment and/or may be training conditions set by performing learning (e.g., machine learning, neural network learning, etc.) on the basis of operating conditions, a usage pattern, and reliability of data of the memory device 220 according to another example embodiment. That is, the mapping table may be a table set by performing learning (e.g., machine learning, neural network learning, etc.) on the basis of the operating conditions, the usage pattern of the memory device 220, and/or reliability of the read data, etc. According to at least one example embodiment, the read controller 300 may set the mapping table by perform the learning of the operating conditions of the memory device 220, but the example embodiments are not limited thereto, and for example, the storage controller 210 and/or host controller 110, etc., may set the mapping table, etc.

According to some example embodiments, the predicted conditions may be trigger conditions for changing a current gear level to a different gear level. Additionally, according to some example embodiments, the predicted conditions may be maintenance conditions for maintaining a desired and/or minimum value for each gear level.

Among the above examples, at the gear level Level #5, the predicted conditions are effective under a desired condition and/or a non-error condition, that is, a maintenance condition in which no error occurs and/or the number of errors is below a desired error threshold value. In other words, when a read error value of read data is less than a correctable error value (e.g., the desired error threshold value), that is, when an error rate is at or below a correctable error rate by the error correction circuitry (e.g., ECC 217), e.g., when the error rate is almost zero, etc., the memory device 220 may continuously operate at Level #5 which is the highest speed. In this case, a level of correctable error may be set in various ways according to some example embodiments. For example, when it is assumed that the number of correctable errors is 1 bit, the memory device 220 may operate at Level #5 only when the number of errors in read data is 0, but is not limited thereto. As another example, when it is assumed that the number of correctable errors is 2 bits, the memory device 220 may operate at Level #5 only when the number of errors in read data is 0 or 1, but is not limited thereto. That is, whether to frequently change a gear level may vary according to an error threshold.

In addition, a predicted condition #1 may be a condition for changing a gear level from Level #4 to Level #3 according to at least one example embodiment and/or may be a condition for maintaining a range in which the gear level Level #4 is maintained, e.g., a maintenance condition, according to at least one other example embodiment. Similarly, according to various example embodiments, predicted conditions #2 and #3 may be set as changing conditions and/or maintenance conditions, but the example embodiments are not limited thereto.

However, a predicted condition, for example, a predicted condition #4, may define a plurality of poor memory cell states due to worst operating conditions of the memory device 220, e.g., when an error occurs in a data retention period, when a temperature of the memory device is equal to and/or greater than a desired and/or maximum threshold temperature, when an endurance cycle almost ends, and the like, but not limited thereto. When a current state of the memory device 220 corresponds to one of the plurality of poor memory cell states, for example, the gear level Level #1 may be set and/or a lower gear level than the current gear level may be set.

Figure 6:
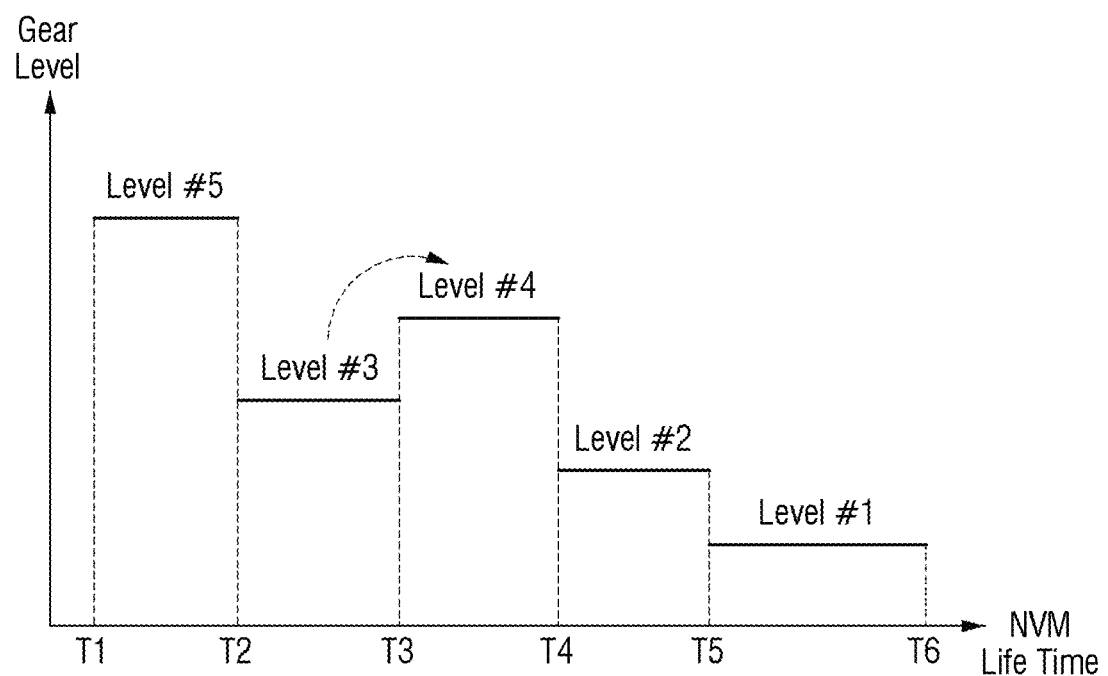

FIGS. 5 and 6 are conceptual diagrams illustrating operating methods of a storage system according to some example embodiments. FIG. 4 will be also referred to.

Referring to FIG. 5, according to some example embodiments, the read controller 300 may read data by setting an initial gear level to Level #5 in the life cycle of the memory device 210.

According to some example embodiments, data is read at Level #5 at a time point T2, and the read controller 300 may read data again by setting the gear level to Level #4, which is a lower level, based on a determined error level of in the data read at Level #5, etc. For example, as described above with reference to FIG. 4, when the level of the error of the read data is less than that of a correctable error, the read controller 300 may change Level #5 to Level #4, which is one step less than Level #5 which is the highest speed, but the example embodiments are not limited thereto.

Level #4 may be maintained when reading of data from the memory device 220 at the gear level Level #4 is successful, and may be changed to Level #3, which is a lower level, when the reading of the data fails (T3), but the example embodiments are not limited thereto. In this case, whether the reading of the data fails or not may be determined on the basis of the predicted conditions described above with reference to FIG. 4.

In addition, according to some example embodiments, when the level of the error in the data read at Level #5 at the time point T2 exceeds a desired and/or preset error rate, the read controller 300 may select a predicted condition matching the current operating characteristics of the memory device 220 from the mapping table of FIG. 4, and set a gear level mapped to and/or corresponding to the selected predicted condition. For example, a current gear level of Level #5 may not be changed to Level #4 but may be changed to a different gear level, e.g., Level #3, etc., corresponding to a condition matching current operating characteristics among a plurality of predicted conditions.

Changing gear levels may be performed until a set current gear level reaches Level #1, which is the lowest and/or minimum gear level, of the memory device 220.

Meanwhile, referring to FIG. 6, according to some example embodiments, the current gear level may be changed to a gear level having a higher speed than the current gear level set according to current operating characteristics of the memory device 220.

For example, at the time point T2, the read controller 300 may change the current gear level from Level #5 to Level #3 according to and/or based on a current operating state of the memory device 220, but at a time point T3, the operating characteristics of the memory device 220 seem to be recovered (e.g., a case in which the level of the error in the read data is less than a desired and/or preset threshold and/or an operating temperature is low for a certain period of time, a case in which data is read without errors for a desired and/or preset time period even when the memory device 220 operates at Level #3, and the like).

In this case, the current gear level may be changed from Level #3 to Level #4 at the time point T3 according to and/or based on an operating characteristic recovery condition (e.g., the new and/or current operating characteristics of the memory device 220). The operating characteristic recovery condition may be a condition defined in the mapping table as shown in FIG. 4, and/or may be a condition set and/or arbitrarily set by a user according to some example embodiments, and/or may be a condition set based on learned data (e.g., machine learning, neural network learning, etc.) according to some example embodiments, but are not limited thereto.

Figure 7:
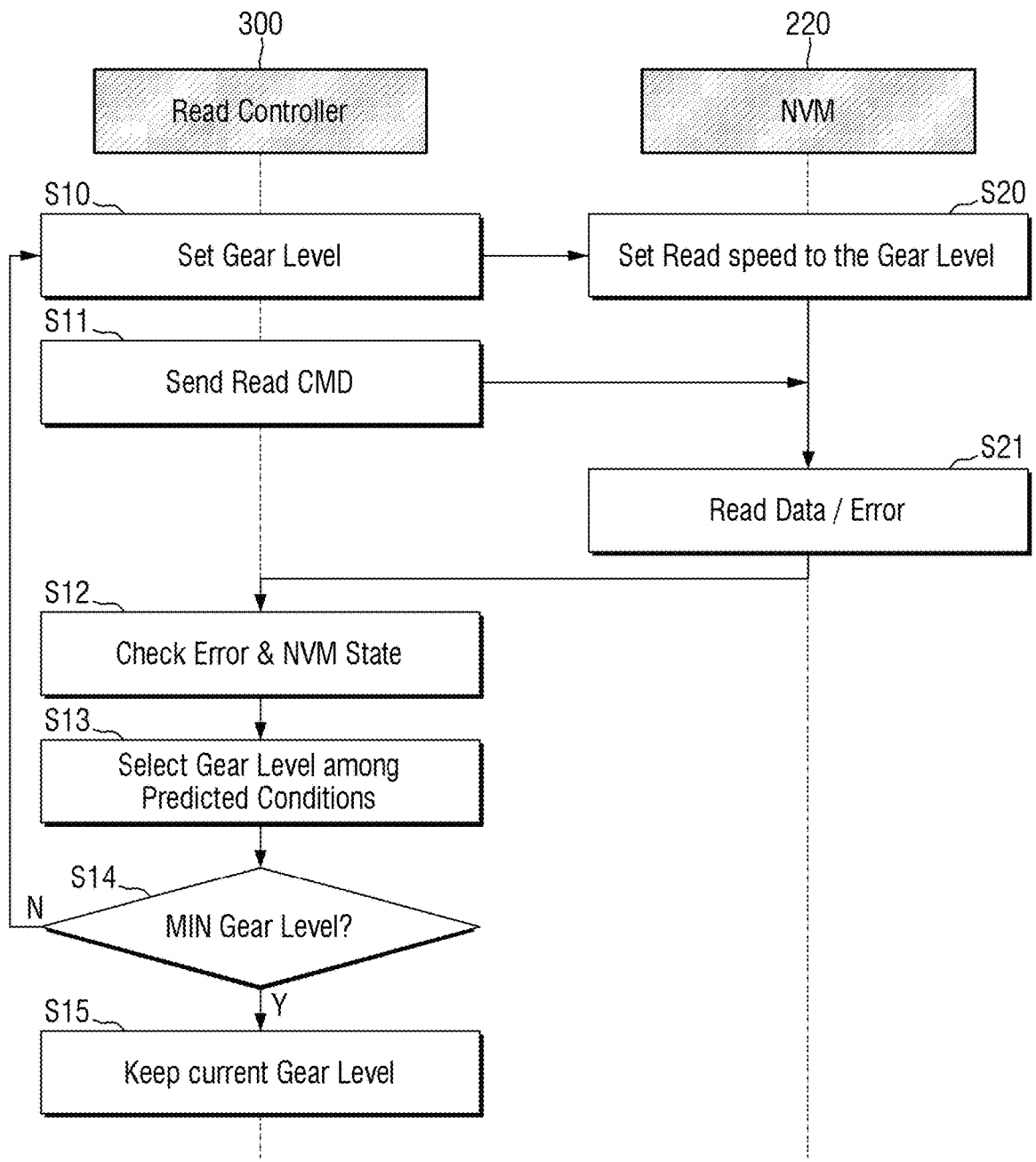
FIG. 7 is a diagram illustrating an operating method of a storage system according to some example embodiments.

FIG. 7 is a diagram illustrating an operating method of a storage system according to some example embodiments.

Referring to FIG. 7, first, the read controller 300 may set a gear level (e.g., a current gear level, a desired gear level, and/or a selected gear level) (S10) and transmits a command and/or instruction to the memory device 220 to set the gear level at the set gear level (S20). The read controller 300 may then transmit a read command to the memory device 220 to read data at the set gear level (S11). The memory device 220 reads data at the set gear level set according to the read command (S21), and the read controller 300 may check and/or determine whether the read data contains error and/or checks and/or determines whether there is an error in the current operating state, condition, and/or characteristics of the memory device 220 (S12).

In response to the results of the error checking and/or memory device condition checking, the read controller 300 may then check a condition corresponding to a level of the identified error and the state of the memory device 220 among a plurality of predicted conditions, and may select a gear level matching the checked condition as a speed at which data is to be read from the memory device 220 (S13). According to some example embodiments, the predicted conditions may be predicted constraints including at least one of a data retention period, a temperature of the memory device 220, an endurance cycle, a data read intensity, and/or a unique chip characteristic, etc., but are not limited thereto. The constraints may be prediction conditions set and/or arbitrarily set by a user according to at least one example embodiment and/or may be training conditions set by performing learning (e.g., machine learning, neural network learning, etc.) on the basis of operating conditions, a usage pattern, and/or reliability of data, etc., of the memory device 220 according to another example embodiment, but are not limited thereto.

According to some example embodiments, when the memory device 220 does not match any one of a plurality of worst-case conditions, e.g., the predicted condition #4, etc., of FIG. 4, the memory device 220 may operate at a gear level of Level #5 to Level #2, but the example embodiments are not limited thereto. For example, in operation S11, the read controller 300 may set Level #5, which is the highest speed, on the basis of the state of the memory device 220 at an early stage in the life cycle of the memory device 220, but the example embodiments are not limited thereto.

As another example, when an error occurs and/or is detected by the read controller 300, the read controller 300 may identify a level of the error (e.g., the number of bits which contain an error and/or need to be corrected) and/or a current state (e.g., the NVM state, etc.) of the memory device 220 (S12), and selects a condition corresponding to the error and/or the state of the memory device 220. In this case, the selected condition may correspond to, for example, one of a gear level of Level #4 to Level #1, etc., on the basis of the mapping table of FIG. 4, but the example embodiments are not limited thereto. In this case, according to at least one example embodiment, the selected gear level may be a gear level gradually lowered as described above with reference to FIG. 5 or 6, but is not limited thereto. In another example embodiment, the selected gear level may be a gear level lowered by at least two steps, but is not limited thereto. In another example embodiment, the selected gear level may be a gear level higher than a currently set gear level, etc.

When the selected gear level is the lowest and/or minimum speed, e.g., Level #1 (S14), the read controller 300 may continuously perform a read operation at the gear level of Level #1 (S15). However, when the selected gear level is not Level #1 which is the lowest and/or minimum speed among a plurality of desired and/or preset gear levels (S14), another gear level is selected again (S10), and operations S10 to S14, S20 and S21 may be performed again.

Figure 8:
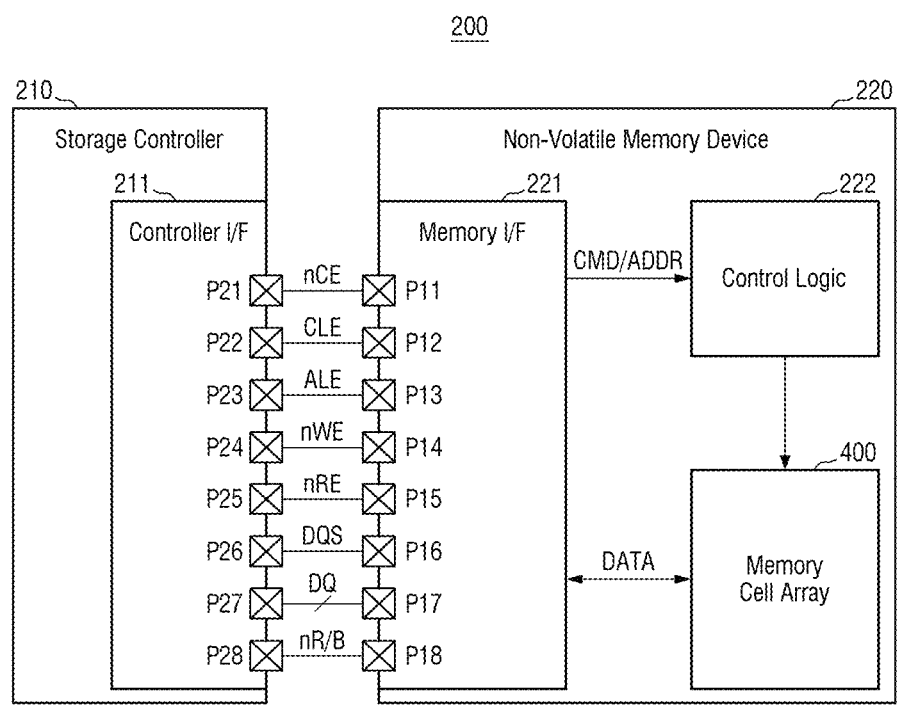
FIG. 8 is a block diagram of a memory system according to at least one example embodiment of the inventive concepts.

FIG. 8 is a block diagram of a memory system according to at least one example embodiment of the inventive concepts. According to at least one example embodiment, the memory system of FIG. 8 may correspond to the storage device 200 of FIG. 1, but the example embodiments are not limited thereto. Referring to FIG. 8, a memory system 200 (e.g., a storage device, a storage device system, etc.) may include a memory device 220 and/or a storage controller 210, etc., but is not limited thereto. The memory system 200 may support a plurality of channels CH1 to CHm, and the memory device 220 and the storage controller 210 may be connected through the plurality of channels CH1 to CHm, but the example embodiments are not limited thereto. For example, the memory system 200 may be embodied as a storage device such as a solid-state drive (SSD), etc.

The memory device 220 may include a plurality of nonvolatile memory devices NVM11 to NVMmn. Each of the nonvolatile memory devices NVM11 to NVMmn may be connected to one of the plurality of channels CH1 to CHm through a corresponding way, but is not limited thereto. For example, the nonvolatile memory devices NVM11 to NVM1n may be connected to the first channel CH1 through ways W11 to W1n, and the nonvolatile memory devices NVM21 to NVM2n may be connected to the second channel CH2 through ways W21 to W2n, etc. In at least one example embodiment, each of the nonvolatile memory devices NVM11 to NVMmn may be embodied as a memory unit capable of operating according to an individual command from the storage controller 210, but the example embodiments are not limited thereto. For example, each of the nonvolatile memory devices NVM11 to NVMmn may be embodied as a chip or a die but the example embodiments of the inventive concepts are not limited thereto.

The storage controller 210 may transmit a signal to and/or receive a signal from the memory device 220 through the plurality of channels CH1 to CHm. For example, the storage controller 210 may transmit one or more commands CMDa to CMDm, one or more addresses ADDRa to ADDRm, and/or one or more data DATAa to DATAm to the memory device 220 and/or receive one or more data DATAa to DATAm from the memory device 220 through the channels CH1 to CHm.

The storage controller 210 may select at least one of the nonvolatile memory devices, which are connected to the channels, through a corresponding channel, and transmit at least one signal to and/or receive at least one signal from the selected nonvolatile memory device. The storage controller 210 may transmit one or more signals to and/or receive one or more signals in parallel from the memory device 220 through different channels. For example, the storage controller 210 may transmit the command CMDb to the memory device 220 through the second channel CH2 while transmitting the command CMDa to the memory device 220 through the first channel CH1, but is not limited thereto. For example, the storage controller 210 may receive the data DATAb from the memory device 220 through the second channel CH2 while receiving the data DATAa from the memory device 220 through the first channel CH1, but is not limited thereto.

The storage controller 210 may control overall operations of the memory device 220. The storage controller 210 may control the nonvolatile memory devices NVM11 to NVMmn connected to the channels CH1 to CHm by transmitting at least one signal to the channels CH1 to CHm.

According to some example embodiments, the memory system 200 may include the memory device 220 and/or the storage controller 210, etc., but is not limited thereto. The storage controller 210 may correspond to the storage controller 200 of FIG. 1, but the example embodiments are not limited thereto.

The memory device 220 may include a plurality of pins, such as first to eighth pins P11 to P18, etc., a memory interface circuit 221, a control logic circuit 222, and/or a memory cell array 400, etc., but the example embodiments are not limited thereto.

The memory interface circuit 221 may receive a chip enable signal nCE from the storage controller 210 through the first pin P11, etc. The memory interface circuit 221 may transmit signals to and/or receive signals from the storage controller 210 through the second to eighth pins P12 to P18 according to the chip enable signal nCE, etc. For example, when the chip enable signal nCE is in an enabled state (for example, a low level), the memory interface circuit 221 may transmit signals to and/or receive signals from the storage controller 210 through the second to eighth pins P12 to P18, etc.

The memory interface circuit 221 may receive a command latch enable signal CLE, an address latch enable signal ALE, and/or a write enable signal nWE, etc., from the storage controller 210 through the second to fourth pins P12 to P14, but is not limited thereto. The memory interface circuit 221 may receive a data signal DQ from and/or transmit the data signal DQ to the storage controller 210 through the seventh pin P17, etc. A command CMD, an address ADDR, and/or data DATA may be transmitted through the data signal DQ, etc. For example, the data signal DQ may be transmitted through a plurality of data signal lines. In this case, the seventh pin P17 may include a plurality of pins corresponding to a plurality of data signals, but the example embodiments are not limited thereto.

The memory interface circuit 221 may receive the command CMD from the data signal DQ received in an enable section (e.g., at a high level state) of the command latch enable signal CLE on the basis of toggle timings of the write enable signal nWE. The memory interface circuit 221 may receive the address ADDR from the data signal DQ received in an enable section (e.g., at a high level state) of the address latch enable signal ALE on the basis of the toggle timings of the write enable signal nWE.

In at least one example embodiment, the write enable signal nWE may be maintained at a static state (e.g., a high level or a low level) and thereafter toggled between the high level and the low level. For example, the write enable signal nWE may be toggled in a section in which the command CMD and/or the address ADDR is transmitted. Accordingly, the memory interface circuit 221 may obtain the command CMD and/or the address ADDR on the basis of the toggle timings of the write enable signal nWE.

The memory interface circuit 221 may receive a read enable signal nRE from the storage controller 210 through the fifth pin P15, etc. The memory interface circuit 221 may receive a data strobe signal DQS from and/or transmit the data strobe signal DQS to the storage controller 210 through the sixth pin P16, etc.

In a data DATA output operation of the memory device 220, the memory interface circuit 221 may receive the read enable signal nRE, which is toggling, through the fifth pin P15 before outputting the data DATA but the example embodiments are not limited thereto. The memory interface circuit 221 may generate a data strobe signal DQS, which is toggling, on the basis of toggling of the read enable signal nRE. For example, the memory interface circuit 221 may generate the data strobe signal DQS that starts toggling after a desired and/or predetermined delay time (e.g., tDQSRE) from a toggling start time of the read enable signal nRE but the example embodiments are not limited thereto. The memory interface circuit 221 may transmit the data signal DQ including the data DATA on the basis of a toggle timing of the data strobe signal DQS, etc. Accordingly, the data DATA may be aligned with the toggle timing of the data strobe signal DQS and transmitted to the storage controller 210, but is not limited thereto.

In a data DATA input operation of the memory device 220, when the data signal DQ including the data DATA is received from the storage controller 210, the memory interface circuit 221 may receive the data strobe signal DQS, which toggles along with the data DATA, from the storage controller 210, but the example embodiments are not limited thereto. The memory interface circuit 221 may obtain the data DATA from the data signal DQ on the basis of the toggle timing of the data strobe signal DQS. For example, the memory interface circuit 221 may obtain the data DATA by sampling the data signal DQ at a rising edge and a falling edge of the data strobe signal DQS, but the example embodiments are not limited thereto.

The memory interface circuit 221 may transmit a ready/busy output signal nR/B to the storage controller 210 through the eighth pin P18, etc. The memory interface circuit 221 may transmit state information of the memory device 220 to the storage controller 210 through the ready/busy output signal nR/B, but is not limited thereto. When the memory device 220 is in a busy state (e.g., when internal operations of the memory device 220 are being performed), the memory interface circuit 221 may transmit the ready/busy output signal nR/B indicating the busy state to the storage controller 210 but the example embodiments are not limited thereto. When the memory device 220 is in a ready state (e.g., when the internal operations of the memory device 220 are not performed or are completed), the memory interface circuit 221 may transmit the ready/busy output signal nR/B indicating the ready state to the storage controller 210 but the example embodiments are not limited thereto. For example, while the memory device 220 reads the data DATA from the memory cell array 400 in response to a page read command, the memory interface circuit 22 may transmit the ready/busy output signal nR/B indicating the busy state (e.g., a low level) to the storage controller 210, etc. For example, while the memory device 220 is programming the data DATA to the memory cell array 400 in response to a program command, the memory interface circuit 221 may transmit the ready/busy output signal nR/B indicating the busy state to the storage controller 210, etc.

The control logic circuit 222 (e.g., control processing circuitry, etc.) may generally control various operations of the memory device 220. The control logic circuit 222 may receive the command CMD/address ADDR obtained by the memory interface circuit 221. The control logic circuit 222 may generate control signals for controlling other components of the memory device 220 according to the received command CMD/address ADDR. For example, the control logic circuit 222 may generate various control signals for programming the data DATA to and/or reading the data DATA from the memory cell array 400, etc.

The memory cell array 400 may store the data DATA obtained from the memory interface circuit 221 under control of the control logic circuit 222. The memory cell array 400 may output the stored data DATA to the memory interface circuit 221 under control of the control logic circuit 222.

The memory cell array 400 may include a plurality of memory cells. For example, the plurality of memory cells may be flash memory cells, etc. However, the example embodiments of the inventive concepts are not limited thereto, and the memory cells may be, e.g., resistive random access memory (RRAM) cells, ferroelectric RAM (FRAM) cells, phase-change RAM (PRAM) cells, thyristor RAM (TRAM) cells, and/or magnetic RAM (MRAM) cells, etc. Example embodiments of the inventive concepts will be described below with respect to some example embodiments in which memory cells are NAND flash memory cells for the sake of convenience and brevity, but the example embodiments are not limited thereto.

The storage controller 210 may include a plurality of pins, e.g., first to eighth pins P21 to P28, etc., and/or a controller interface circuit 211 (e.g., a host interface circuit, etc.), but is not limited thereto. The first to eighth pins P21 to P28 may correspond to the first to eighth pins P11 to P18 of the memory device 220, but the example embodiments are not limited thereto.

The controller interface circuit 410 may transmit the chip enable signal nCE to the memory device 220 through the first pin P21, etc. The controller interface circuit 410 may transmit signals to and receive signals from the memory device 220, which is selected by the chip enable signal nCE, through the second to eighth pins P22 to P28, etc.

The controller interface circuit 410 may transmit the command latch enable signal CLE, the address latch enable signal ALE, and/or the write enable signal nWE, etc. to the memory device 220 through the second to fourth pins P22 to P24, but is not limited thereto. The controller interface circuit 410 may transmit the data signal DQ to and/or receive the data signal DQ from the memory device 220 through the seventh pin P27, etc.

The controller interface circuit 410 may transmit the data signal DQ including the command CMD and/or the address ADDR to the memory device 220, together with the write enable signal nWE that toggles, but the example embodiments are not limited thereto. The controller interface circuit 410 may transmit the command latch enable signal CLE that is in the enabled state to transmit the data signal DQ including the command CMD to the memory device 220, and transmit the address latch enable signal ALE that is in the enabled state to transmit the data signal DQ including the address ADDR to the memory device 220, but is not limited thereto.

The controller interface circuit 410 may transmit the read enable signal nRE to the memory device 220 through the fifth pin P25, etc. The controller interface circuit 410 may receive the data strobe signal DQS from or transmit the data strobe signal DQS from the memory device 220 through the sixth pin P26, etc.

In a data DATA output operation of the memory device 220, the controller interface circuit 410 may generate the read enable signal nRE that toggles and/or transmit the read enable signal nRE to the memory device 220, etc. For example, the controller interface circuit 410 may generate the read enable signal nRE that changes from a static state (e.g., a high level or a low level) to a toggle state before the data DATA is output, but is not limited thereto. Accordingly, the memory device 220 may generate the data strobe signal DQS that toggles based on the read enable signal nRE. The controller interface circuit 410 may receive the data signal DQ including data DATA from the memory device 220, together with the data strobe signal DQS that toggles, etc. The controller interface circuit 410 may obtain the data DATA from the data signal DQ on the basis of the toggle timing of the data strobe signal DQS, etc.

According to some example embodiments, the controller interface circuit 211 may transmit the read command Read CMD, the address ADDR, and/or the read enable signal nRE to the memory device 220, but is not limited thereto. In this case, the memory device 220 may read main data, which corresponds to the address ADDR, from a memory cell array 430 according to the read enable signal nRE. In this case, a speed at which the main data is read is based on a gear level set by the read controller 300. The read controller 300 may adaptively change the gear level on the basis of a state of the memory device 220.

In a data DATA input operation of the memory device 220, the controller interface circuit 410 may generate the data strobe signal DQS that toggles. For example, the controller interface circuit 410 may generate the data strobe signal DQS that changes from a static state (e.g., a high level or a low level) to a toggle state before the data DATA is transmitted, but is not limited thereto. The controller interface circuit 410 may transmit the data signal DQ including the data DATA to the memory device 220 on the basis of toggle timings of the data strobe signal DQS.

The controller interface circuit 410 may receive the ready/busy output signal nR/B from the memory device 220 through the eighth pin P28, etc. The controller interface circuit 410 may identify state information of the memory device 220 on the basis of the ready/busy output signal nR/B, etc.

Figure 9:
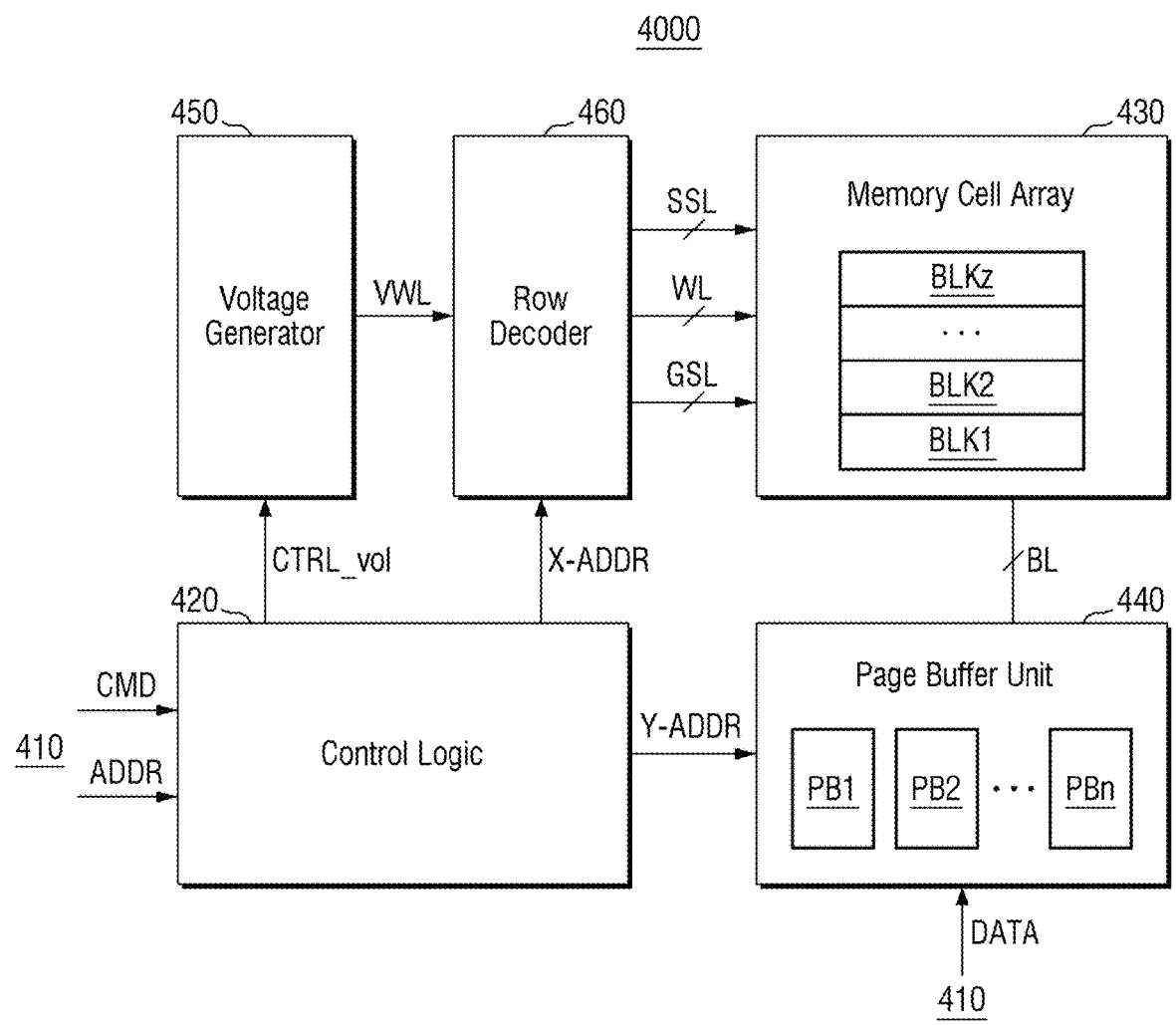
FIG. 9 is a block diagram of an example of the memory device 220 of FIG. 1 according to some example embodiments.

FIG. 9 is a block diagram of an example of the memory device 220 of FIG. 1 according to some example embodiments. Referring to FIG. 9, a memory device 4000 may include a control logic circuit 420, a memory cell array 430, a page buffer unit 440, a voltage generator 450, and/or a row decoder 460, etc., but the example embodiments are not limited thereto. The memory device 4000 may further include a memory interface circuit 410 shown in FIG. 9, and may further include a column logic, a pre-decoder, a temperature sensor, a command decoder, an address decoder, and the like, but the example embodiments are not limited thereto.

The control logic circuit 420 may generally control various operations in the memory device 4000. The control logic circuit 420 may output various control signals in response to a command CMD and/or an address ADDR from the memory interface circuit 410, etc. For example, the control logic circuit 420 may output a voltage control signal CTRL_vol, a row address X-ADDR, and/or a column address Y-ADDR, etc., but is not limited thereto.

The memory cell array 430 may include a plurality of memory blocks BLK1 to BLKz (z is a positive integer), and each of the plurality of memory blocks BLK1 to BLKz may include a plurality of memory cells. The memory cell array 430 may be connected to the page buffer unit 440 through bit lines BL, and connected to the row decoder 460 through word lines WL, string selection lines SSL, and ground selection lines GSL, but the example embodiments are not limited thereto.

In at least one example embodiment, the memory cell array 430 may include a 3D memory cell array, and the 3D memory cell array may include a plurality of NAND strings, etc., but the example embodiments are not limited thereto. Each of the NAND strings may include memory cells connected to the word lines vertically stacked on a substrate. U.S. Pat. Nos. 7,679,133; 8,553,466; 8,654,587; and 8,559,235; and US Publication No. 2011/0233648 are each incorporated herein by reference. In at least one example embodiment, the memory cell array 430 may include a 2D memory cell array and the 2D memory cell array may include a plurality of NAND strings arranged in row and column directions, etc.

The page buffer unit 440 may include a plurality of page buffers PB1 to PBn (where n is an integer greater than or equal to 3), and the plurality of page buffers PB1 to PBn may be connected with the memory cells through the bit lines BL. The page buffer unit 440 may select at least one of the bit lines BL in response to the column address Y-ADDR. The page buffer unit 440 may operate as a write driver and/or a sense amplifier according to an operating mode. For example, during a program operation, the page buffer unit 440 may apply a bit line voltage corresponding to data to be programmed to a selected bit line, but is not limited thereto. During a read operation, the page buffer unit 440 may sense data stored in a memory cell by sensing a current and/or voltage of a selected bit line, etc.

The voltage generator 450 may generate various types of voltages for performing the program operation, the read operation, an erase operation, etc., on the basis of the voltage control signal CTRL_vol. For example, the voltage generator 450 may generate a program voltage, a read voltage, a program-verify voltage, an erase voltage, or the like as a word line voltage VWL, etc.

The row decoder 460 may select one of the word lines WL and one of the string selection lines SSL in response to the row address X-ADDR. For example, the row decoder 460 may apply the program voltage and the program-verify voltage to the selected word line during the program operation, and apply the read voltage to the selected word line during the read operation, but is not limited thereto.

Figure 10:
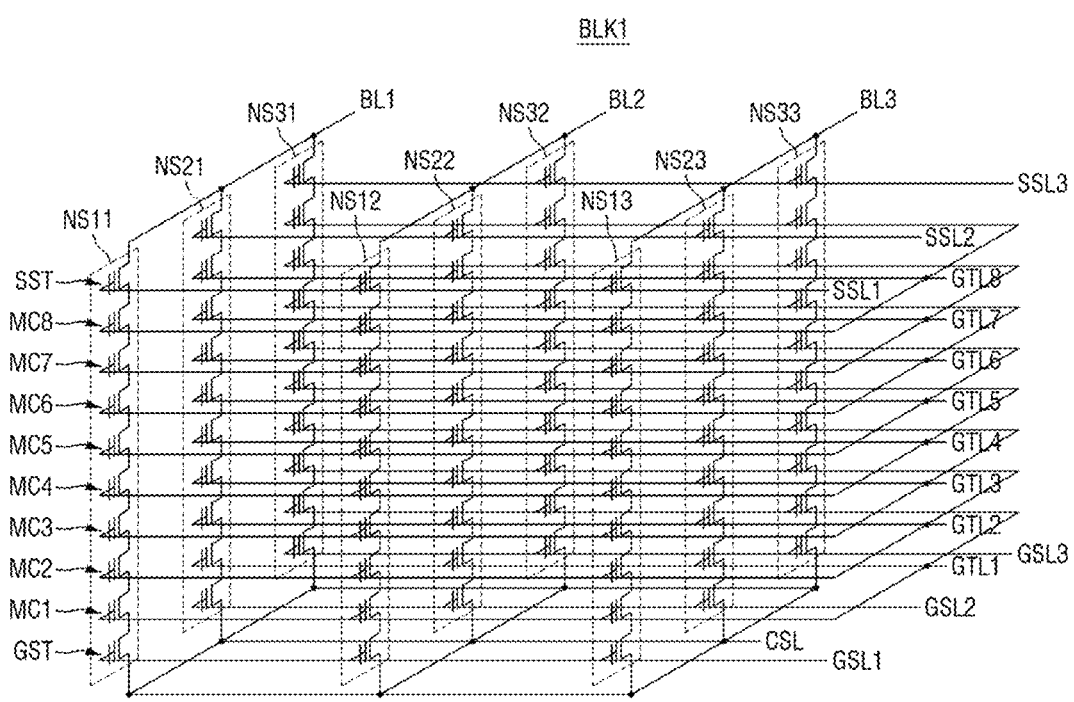
FIG. 10 is a diagram for describing a 3D V-NAND structure applicable to the memory device 220 of FIG. 1 according to some example embodiments.

FIG. 10 is a diagram for describing a 3D V-NAND structure applicable to the memory device 220 of FIG. 1 according to some example embodiments. When a storage module of a memory device is embodied as a 3D V-NAND type flash memory, each of a plurality of memory blocks of the storage module may be represented as an equivalent circuit illustrated in FIG. 10, but the example embodiments are not limited thereto.

A memory block BLKi illustrated in FIG. 10 is a 3D memory block formed in a 3D structure on a substrate, but is not limited thereto. For example, a plurality of memory NAND strings included in the memory block BLKi may be formed in a direction perpendicular to the substrate, but is not limited thereto.

Referring to FIG. 10, the memory block BLKi may include a plurality of memory NAND strings NS11 to NS33 connected between a plurality of bit lines BL1, BL2, and BL3, etc., and a common source line CSL. Each of the plurality of memory NAND strings NS11 to NS33 may include a string selection transistor SST, a plurality of memory cells MC1, MC2, . . . , MC8, and a ground selection transistor GST. FIG. 10 illustrates that each of the plurality of memory NAND strings NS11 to NS33 includes eight memory cells MC1 to MC8, but the example embodiments are not limited thereto.

The string selection transistor SST may be connected to a plurality of string selection lines SSL1, SSL2, and SSL3, etc., corresponding thereto, but is not limited thereto. The plurality of memory cells MC1, MC2, . . . , MC8 may be connected to a corresponding plurality of gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines, but are not limited thereto. The ground selection transistor GST may be connected to a plurality of ground selection lines GSL1, GSL2, and GSL3, etc., corresponding thereto. The string selection transistor SST may be connected to the plurality of bit lines BL1, BL2, and BL3, etc., corresponding thereto, and the ground selection transistor GST may be connected to the common source line CSL.

Word lines (e.g., word lines WL1) having the same height may be connected in common, and the ground selection lines GSL1, GSL2, and GSL3 and the string selection lines SSL1, SSL2, and SSL3 may be separated from each other. FIG. 10 illustrates that a memory block BLK is connected to the eight gate lines GTL1 to GTL8 and three bit lines BL1, BL2, and BL3, but the example embodiments are not limited thereto.

Figure 11:
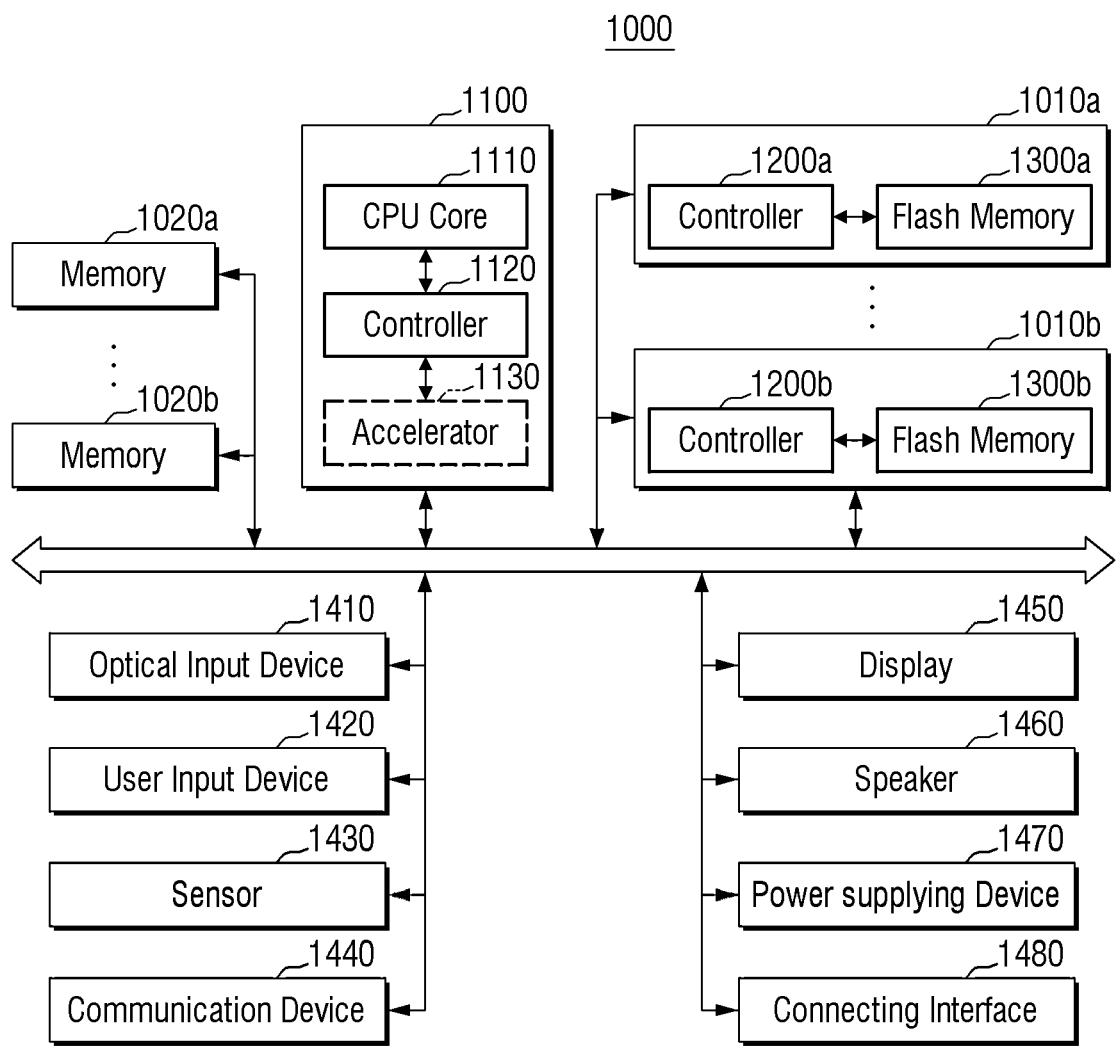
FIG. 11 is a diagram illustrating a system to which the storage device 200 of FIG. 1 is applied according to some example embodiments.

FIG. 11 is a diagram illustrating a system to which the storage device 200 of FIG. 1 is applied according to at least one example embodiment.

A system 1000 of FIG. 11 may be a mobile system such as a mobile phone, a smart phone, a tablet personal computer, a laptop, a wearable device, a healthcare device, a robotic device, a virtual reality device and/or an augmented reality device, an autonomous vehicle, and/or an Internet-of-things (IOT) device, etc., but the example embodiments are not limited thereto. However, the system 1000 of FIG. 11 is not necessarily limited to the mobile system, and may be a personal computer, a laptop computer, a server, a media player, and/or an automotive device such as a navigation system, etc.

Referring to FIG. 11, the system 1000 may include at least one main processor 1100, a plurality of memories 1200a and 1200b, and/or a plurality of storage devices 1300a and 1300b, and may further include at least one of an image capturing device 1410, a user input device 1420, a sensor 1430, a communication device 1440, a display 1450, a speaker 1460, a power supply device 1470, and/or a connection interface 1480, etc., but the example embodiments are not limited thereto and may contain a greater or lesser number of constituent elements.

The main processor 1100 may control overall operations of the system 1000, and more specifically, operations of other components of the system 1000, but is not limited thereto. The main processor 1100 may be embodied as a general-purpose processor, a dedicated processor, an application processor, or the like.

The main processor 1100 may include one or more control unit cores 1110 (e.g., processor cores, processing cores, etc.), and may further include a controller 1120 for controlling the memories 1200a and 1200b and/or the storage devices 1300a and 1300b, etc. According to at least one example embodiment, the main processor 1100 may further include an accelerator block 1130, which is a dedicated circuit for high-speed data operation such as an artificial intelligence (AI) data operation, but is not limited thereto. The accelerator block 1130 may include a graphics processing unit (GPU), a neural processing unit (NPU), and/or a data processing unit (DPU), and may be embodied as a chip physically independent from the other components of the main processor 1100, but the example embodiments are not limited thereto.

The memories 1200a and 1200b may be used as main memory devices of the system 1000, and may include volatile memories such as a SRAM and/or DRAM but may include nonvolatile memories, such as a flash memory, PRAM and/or RRAM, etc. The memories 1200a and 1200b may be implemented in the same package as the main processor 1100, but are not limited thereto.

The storage devices 1300a and 1300b may function as nonvolatile storage devices that store data regardless of whether power is supplied or not, and may have a relatively larger storage capacity than the memories 1200a and 1200b. The storage devices 1300a and 1300b may include storage controllers 1310a and 1310b, and non-volatile memory (NVM) storages 1320a and 1320b that store data under control of the storage controllers 1310a and 1310b, etc. The NVM storage 1320a and 1320b may include 2D and/or 3D V-NAND flash memories but may include other types of NVMs such as a PRAM and/or RRAM, etc.

The storage devices 1300a and 1300b may be included in the system 1000 to be physically separated from the main processor 1100 and/or may be included in the same package as the main processor 1100. Additionally, the storage devices 1300a and 1300b may have the same shape as a memory card and thus may be detachably coupled with the other components of the system 1000 through an interface such as the connection interface 1480 to be described below, but are not limited thereto. The storage devices 1300a and 1300b may be devices to which standard conventions such as universal flash storage (UFS) are applied, but are not limited thereto.

The image capturing device 1410 may capture a still image and/or a moving picture and may include a camera, a camcorder, and/or a webcam, etc.

The user input device 1420 may receive various types of data input from a user of the system 1000 and may include a touch pad, a keypad, a keyboard, a mouse, and/or a microphone, etc.

The sensor 1430 may detect various types of physical quantities that may be obtained from the outside of the system 1000 and convert the detected physical quantities into electrical signals. The sensor 1430 may include a temperature sensor, a pressure sensor, an illuminance sensor, a position sensor, an acceleration sensor, a biosensor, and/or a gyroscope, etc.

The communication device 1440 may perform transmission and/or reception of signals with other devices outside the system 1000 according to various communication protocols. The communication device 1440 may include an antenna, a transceiver, and/or a modem, etc.

The display 1450 and the speaker 1460 may function as output devices that output visual information and audio information to a user of the system 1000.

The power supply device 1470 may appropriately convert power supplied from a battery (not shown) built in the system 1000 and/or an external power supply and supply the converted power to each component of the system 1000.

The connection interface 1480 may connect the system 1000 and an external device, which may exchange data with the system 1000 when connected to the system 1000. The connection interface 1480 may be implemented according to various interface methods, such as advanced technology attachment (ATA), serial ATA (SATA), external SATA (e-SATA), small-computer small-interface (SCSI), serial attached SCSI (SAS), peripheral component interconnection (PCI), PCI express (PCIe), NVM express (NVMe), IEEE 1394, Universal Serial Bus (USB), a secure digital (SD) card, a multi-media card (MMC), an embedded multi-media card (eMMC), universal flash storage (UFS), embedded UFS (eUFS), a compact flash (CF) card interface, and the like.

Although various example embodiments of the inventive concepts have been described above with reference to the accompanying drawings, the example embodiments of the inventive concepts are not limited thereto and may be embodied in various different forms. It will be understood by those of ordinary skill in the art that the example embodiments of the inventive concepts may be implemented in other specific forms without departing from the technical spirit or essential features of the inventive concepts. Accordingly, the example embodiments set forth herein should be considered only as examples and not for purposes of limitation.

What is claimed is:

1. A storage system comprising:
a memory device including a first region including a plurality of single-level cells and a second region different from the first region, the second region including memory cells of a different type than the first region;
error correction circuit configured to detect errors in data; and
a storage controller configured to,
read data from the first region at a first gear level of a plurality of gear levels,
determine an error level of the read data and a current operating state of the memory device, the determining the error level of the read data including comparing a number of errors detected in the read data with a correctable error rate by the error correction circuitry, and
change a gear level of the first region from the first gear level to a second gear level of the plurality of gear levels based on the determined error level of the read data and the determined current operating state of the memory device, and the gear level of the first region being different than a gear level of the second region of the memory device.

2. The storage system of claim 1, wherein the second region comprises at least one of a plurality of multi-level cells, a plurality of triple-level cells, a plurality of quad-level cells, or any combinations thereof.

3. The storage system of claim 1, wherein the second gear level has a lower read speed than the first gear level.

4. The storage system of claim 1, wherein the second gear level has a higher read speed than the first gear level.

5. The storage system of claim 1, wherein the storage controller comprises a mapping table, the mapping table configured to store a plurality of predicted conditions corresponding to the plurality of gear levels.

6. The storage system of claim 5, wherein the plurality of predicted conditions comprises at least one of an error level in the read data, a data retention period, a temperature of the memory device, an endurance cycle, data read intensity, a unique chip characteristic, or any combinations thereof.

7. The storage system of claim 5, wherein the storage controller is further configured to:
identify a predicted condition from the plurality of predicted conditions based on the determined error level in the read data and the determined state of the memory device; and
select a gear level corresponding to the identified predicted condition as the second gear level.

8. The storage system of claim 5, wherein the plurality of predicted conditions of the mapping table are set based on operating conditions of the memory device, usage patterns of the memory device, and reliability values of the read data.

9. An operating method of a storage controller, comprising:
reading data from a first region of a memory device using a first gear level of a plurality of gear levels, the first region including a plurality of single-level cells;
determining an error level of the read data and a current operating state of the memory device, the determining the error of the read data including comparing a number of errors detected in the read data with a correctable error rate by error correction circuitry of the storage controller; and
dynamically setting a read speed of the first region of the memory device from the first gear level to a second gear level of the plurality of gear levels based on the determined error level of the read data and the current operating state of the memory device, the dynamically set read speed of the first region being different than a set read speed of a second region of the memory device, the second region including memory cells of a different type than the first region.

10. The operating method of claim 9, wherein the second gear level has a higher read speed than the first gear level.

11. The operating method of claim 9, wherein the second gear level has a lower read speed than the first gear level.

12. The operating method of claim 9, wherein the storage controller comprises a mapping table including a plurality of predicted conditions corresponding to the plurality of gear levels.

13. The operating method of claim 9, wherein a plurality of predicted conditions comprises at least one of an error level in the read data, a data retention period, a temperature of the memory device, an endurance cycle, data read intensity, a unique chip characteristic, or any combinations thereof.

14. The operating method of claim 13, wherein
the plurality of predicted conditions are conditions for selecting the plurality of gear levels; and
the plurality of predicted conditions are set based on operating conditions of the memory device, usage patterns of the memory device, and reliability values of the read data.

15. The operating method of claim 9, wherein the data read at the first gear level or the second gear level is data stored in a single-level cell area of the memory device.

16. A storage system comprising:
a memory device configured to store data, the memory device including a first region including a plurality of single-level cells and a second region including memory cells of a different type than the first region; and
a storage controller including an error correction code (ECC) engine and a read controller,
the ECC engine is configured to detect level of errors included in data read from the memory device, the detecting the level of errors including comparing a number of errors detected in the data read with a correctable error rate by the ECC engine, and
the read controller is configured to,
determine a current operating state of the memory device, and
dynamically set a read speed of the first region of the memory device to a first gear level from among a plurality of gear levels based on the detected level of errors by the ECC engine and the determined current operating state of the memory device, the dynamically set read speed of the first region being different than a set read speed of the second region of the memory device.

17. The storage system of claim 16, wherein
the second region is a remaining region of the memory device excluding the first region; and
the read controller is further configured to read data read using the first gear level from the first region.

18. The storage system of claim 16, wherein the storage controller comprises a mapping table, the mapping table configured to store a plurality of predicted conditions corresponding to the plurality of gear levels.

19. The storage system of claim 16, wherein the storage controller is further configured to:
identify a predicted condition from a plurality of predicted conditions based on a number of detected errors in the data and the determined state of the memory device; and
select a second gear level corresponding to the identified predicted condition.

20. The storage system of claim 19, wherein, in response to the first gear level being a lowest gear level of the memory device, the storage controller is further configured to maintain a read speed at the lowest gear level.

* * * * *